United States Patent [19]
Enari et al.

[11] Patent Number: 4,912,697
[45] Date of Patent: Mar. 27, 1990

[54] APPARATUS AND METHOD FOR PREVENTING RECORDING ERRORS DUE TO A REDUCTION IN THE RELATIVE SPEED BETWEEN AN INFORMATION CARRYING LIGHT BEAM AND A RECORDING MEDIUM

[75] Inventors: Masahiko Enari, Yokohama; Satoshi Shikichi; Fumiaki Kawaguchi, both of Tokyo; Kenichi Suzuki; Masayuki Usui, both of Yokohama; Hiroshi Matsuoka, Kawasaki; Kazuhiko Matsuoka; Hideki Hosoya, both of Yokohama; Akio Aoki, Tokyo; Kazuo Minoura, Yokohama, all of Japan

[73] Assignee: Canon Kabushiki Kaisha, Tokyo, Japan

[21] Appl. No.: 166,802

[22] Filed: Mar. 3, 1988

Related U.S. Application Data

[63] Continuation of Ser. No. 812,995, Dec. 24, 1985, abandoned.

[30] Foreign Application Priority Data

Dec. 29, 1984 [JP] Japan ................. 59-275172
Apr. 19, 1985 [JP] Japan ................. 60-84109
Apr. 19, 1985 [JP] Japan ................. 60-84111
Jun. 7, 1985 [JP] Japan ................. 60-124696

[51] Int. Cl.$^4$ ........................................... G11B 7/125
[52] U.S. Cl. ..................................... 369/116; 235/455; 235/480; 369/100; 346/76 L
[58] Field of Search ............... 235/455, 479, 480, 481, 235/476; 346/76 L; 369/32, 44, 47, 48, 50, 53, 54, 100, 116, 111, 124

[56] References Cited

U.S. PATENT DOCUMENTS 4,419,750 12/1983 Howe ........................... 369/11
4,554,652 11/1985 Maeda et al. .................. 369/54

FOREIGN PATENT DOCUMENTS 2221914 11/1972 Fed. Rep. of Germany .
52-67302 3/1977 Japan ........................... 369/111
52-67303 3/1977 Japan ........................... 369/111
56-41540 4/1981 Japan ........................... 369/100

Primary Examiner—Donald McElheny, Jr.
Attorney, Agent, or Firm—Fitzpatrick, Cella, Harper & Scinto

[57] ABSTRACT

Method and apparatus for recording information on a card-shaped optical information recording medium with a light beam and/or for reproducing information recorded on the medium. The apparatus includes a device for irradiating the medium with a light beam, a device for causing relative reciprocal movement between the medium and the light beam, and a device for terminating or displacing the light beam on the medium, after the lapse of a predetermined period of time from a moment when the relative speed of the medium and the light beam is reduced below a predetermined speed. The method includes the steps carried out by the apparatus.

16 Claims, 6 Drawing Sheets

APPARATUS AND METHOD FOR PREVENTING RECORDING ERRORS DUE TO A REDUCTION IN THE RELATIVE SPEED BETWEEN AN INFORMATION CARRYING LIGHT BEAM AND A RECORDING MEDIUM

This application is a continuation of application Ser. No. 812,995 filed Dec. 24, 1985, now abandoned.

BACKGROUND OF THE INVENTION

1. Field of the Invention

The present invention relates to an optical information recording-reproducing apparatus, and in particular to such apparatus employing a card-shaped optical information recording medium.

In the present invention, the optical information recording-reproducing apparatus shall include an apparatus for recording information on a medium as mentioned above, an apparatus for reproducing information recorded on such medium, and an apparatus for recording and reproduction of information.

2. Description of the Prior Art

For the purpose of optical recording and reproduction of information there are already known disk-, card- and tape-shaped media. Among these, an optical recording medium formed as a card (hereinafter called optical card) is considered to have a large demand as a small, light and portable recording medium of a large capacity In such optical card, information is recorded as a row of optically detectable record pits by scanning a recording track, determined in advance on the optical card, with a light beam which is modulated according to the information to be recorded and focused to a small spot. In such operation, in order to exactly record the information without failures such as crossing of the rows of record pit,, there has been required automatic tracking for controlling the irradiating position of the light beam in a direction perpendicular to the scanning direction. Also there has been conducted automatic focusing for precisely focusing the light beam onto the optical card. Consequently, in order to obtain a tracking signal and a focusing signal from the recording track, the modulated light beam has been designed to have a power just below the level required for information recording even at the minimum value. On the other hand, the reproduction of recorded information has been conducted by scanning the row of record pits with a light beam of a constant power not enough for information recording onto the optical card.

In the information recording-reproducing means for optical card as explained above, the scanning with the light beam is achieved by relative movement of the optical card and the light beam at information recording or reproduction. As the recording tracks are formed as plural linear lines on the optical card, the scanning is conducted intermittently, inevitably involving standstill states of the light beam.

If the light beam remains standstill in such conventional apparatus, erroneous signal recording may take place by the accumulation of energy even with the light beam of the aforementioned level not enough for information recording. Such erroneous signal is also detected by the light beam, causing serious trouble, for example, in track access, an operation of moving the light beam to a desired track position.

SUMMARY OF THE INVENTION

The object of the present invention is to provide an optical information recording-reproducing apparatus not associated with the above-mentioned drawbacks of conventional apparatus and constantly enabling exact information recording and reproduction avoiding erroneous information recording in the standstill state of the light beam.

The above-mentioned object can be achieved, according to the present invention, by an optical information recording-reproducing apparatus, provided with means for irradiating a card-shaped optical information recording medium with a light beam and means for causing relative movement of the light beam and the medium for recording information on the medium with said light beam or reproducing information recorded on said medium, the apparatus comprising means for preventing information recording by the light beam when the light beam and medium are not in relative movement.

DESCRIPTION OF THE PREFERRED EMBODIMENTS

Figure 1:
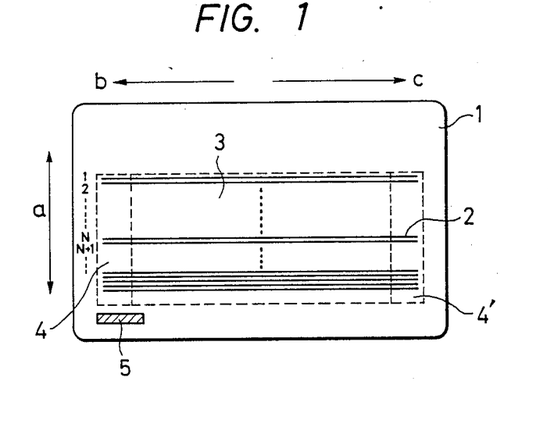
FIG. 1 is a schematic plan view of an example of an optical card to be employed in the apparatus of the present invention.

FIG. 1 is a schematic plan view of an optical card to be employed in the apparatus of the present invention, wherein shown are an optical card 1; plural linear recording tracks 2 formed on the card; a data recording area 3 of the recording track to be scanned with a light beam at a predetermined speed; track selecting areas 4, 4' in which a desired track is searched; and a home position 5 of the light beam. In the initial state, the light beam is stopped at the home position. For information recording or reproduction the light beam moves in the track selecting area 4 in a direction a to search an N-th track 2 in which the information is to be recorded or reproduced. Then the light beam scans the data recording area 3 of the track 2 in a direction of arrow c to record or reproduce information. Upon completion thereof, the light beam stops in the track selecting area 4' and remains at a standstill until succeeding information recording or reproduction. Then, in response to an instruction for information recording or reproduction, the light beam moves in said selecting area 4' in a direction a, toward a track, for example (N+1)-th, for recording or reproduction, and subsequently scans the data recording area of said track in a direction of arrow b, thus effecting information recording or reproduction. The above-explained steps are repeated t record or reproduce data of a required amount.

Figure 2A:
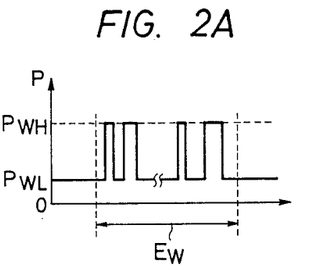
FIGS. 2A and 2B are charts showing the power of the light beam on the optical card respectively at recording an reproduction.
Figure 2B:
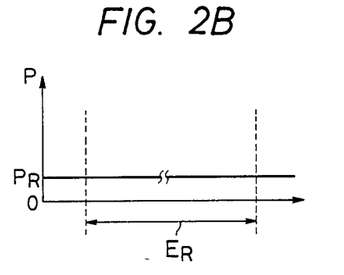

FIGS. 2A and 2B are charts showing the power of the light beam on the optical card respectively in information recording and reproduction, wherein the abscissa indicates the position on the track while the ordinate indicates the power P of the light beam. At information recording, as shown in FIG. 2A, the light beam in a scanning range EW corresponding to the data recording area irradiates the optical card with a constant minimum power $P_{WL}$ required for obtaining a tracking signal and a focusing signal and still not enough for forming record pits. It is modulated to a power level $P_{WH}$ required for recording in response to the signals to be recorded, and the record bits are formed only in areas irradiated with power $P_{WH}$. At information reproduction the card is irradiated by the light beam in a scanning range ER with a constant power $P_R$ not enough for forming record pits whereby the record pits are read.

Figure 3:
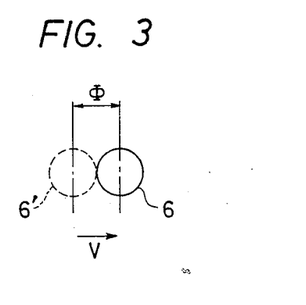
FIG. 3 is a schematic view showing the mode of scanning with a light beam spot on the optical card.

The recording sensitivity of the optical card is generally determined by the irradiating power P and irradiating time T of he light beam. Thus, a light beam moving with a relative speed V from 6' to 6 as shown in FIG. 3 is not recorded if V exceeds $\Phi/T$ wherein $\Phi$ is the diameter f the light beam spot. However, if the light beam remains in the standstill state for a long time, there will result an erroneous recording even when the power of the light beam is equal to $P_{WL}$ or $P_R$. In the present invention it is rendered possible to prevent the erroneous recording in such a standstill state.

Figure 4:
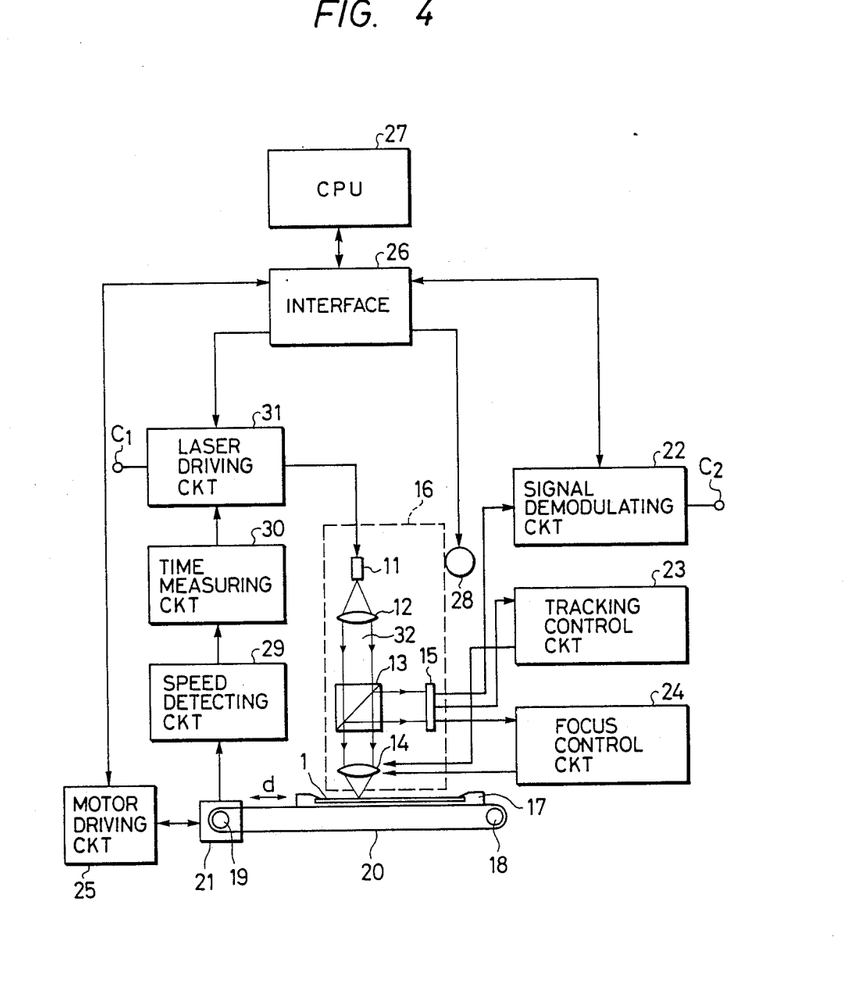
FIG. 4 is a schematic view showing the structure of a first embodiment of the optical information recording-reproducing apparatus of the present invention.

FIG. 4 is a schematic view of a first embodiment of an optical information recording-reproducing apparatus of the present invention, wherein an optical card 1, as shown in FIG. 1, is placed on a support 17 fixed to a belt 20, which is provided between pulleys 19, 18 and driven in a direction d by a motor 21 to displace the optical card 1 in direction d. Consequently a light beam 32 emitted by an optical head 16 scans the optical card in the direction b or c shown in FIG. 1. The optical head 16 is composed of a semiconductor laser 11, a collimating lens 12, a beam splitter 13, an objective lens 14 and a photodetector 15. The light beam, emitted by the semiconductor laser 11, is focused by the objective lens 14, as a small spot on the optical card 1. Light reflected by the optical card again passes the objective lens 14, then separated from the entering light by the beam splitter 13 and is detected by the photodetector 15. A signal detected by said photodetector 15 is supplied to a signal demodulating circuit 22, a tracking control circuit 23 and a focus control circuit 24, of which the latter two respectively move the objective lens 14 in the axial direction and a perpendicular direction thereto for automatic focusing and automatic tracking.

A stepping motor 28 moves the optical head 16 in a direction perpendicular to the plane of drawing, thus displacing the irradiating position of the light beam in the direction as shown in FIG. 1. The motor 21 is controlled by a motor driving circuit 25 to move and stop the optical card. The driving speed of the motor 21 is detected by a speed detecting circuit 29 which is connected through a time measuring circuit 30 to a laser driving circuit 31 for driving the semiconductor laser 11. Also the signal demodulating circuit 22, stepping motor 28, motor driving circuit 25 and laser driving circuit 31 are connected, through an interface 26, to a central processing unit (CPU) 27.

At information recording or reproduction in the above-described apparatus, the CPU 27 drives the motor 21 and the stepping motor 28 to scan the data recording area 3 with the light beam as already explained in relation to FIG. 1. In this operation the power of the light beam 32 from the semiconductor laser 11 on the optical card is constantly equal to $P_{WL}$ or $P_R$ shown in FIG. 2A or 2B, and is modulated up to a level $P_{WH}$ in the case of information recording, according to a recording signal entered from a terminal C1. On the other hand, in the case of signal reproduction, the reproduced signal is released from a terminal C2. Upon completion of the operation, the motor 21 is stopped so that the light beam remains still with a power $P_{WL}$ or $P_R$. When the motor 21 is stopped, the speed detecting circuit 29 identifies that the relative speed V between the optical card and the light beam has become equal to zero and activates the time measuring circuit 30 having a preset time $T_{OFF}$. When the time from the activation becomes equal to the time $T_{OFF}$, an irradiation terminating signal is supplied to the laser driving circuit 31 to terminate the light emission from the semiconductor laser 11. The time measuring circuit is reset if a condition $V \neq 0$ is reached by a succeeding operation started in a period $t < T_{OFF}$. The time $T_{OFF}$ is so selected as to satisfy a condition $T_{OFF} < T_S$, wherein $T_S$ is the time required for recording with a stopped beam of the aforementioned power $P_{WL}$ or $P_R$. (For example $T_{OFF} = T_S/2$) Also the preset time $T_{OFF}$ may be rendered stepwise variable by an external selector switch or continuously variable by a variable resistor according to the recording sensitivity of the optical card.

In the foregoing embodiment, the beam irradiation to the medium is interrupted for preventing erroneous recording in a non-operating state, but it is also possible to reduce the power of the light beam to a level at which recording is not achieved even if the light beam is maintained still for a prolonged period. Such an embodiment will be explained in the following. The structure of the apparatus in such an embodiment is essentially similar to that shown in FIG. 4 and will not therefore be explained in detail.

Figure 5A:
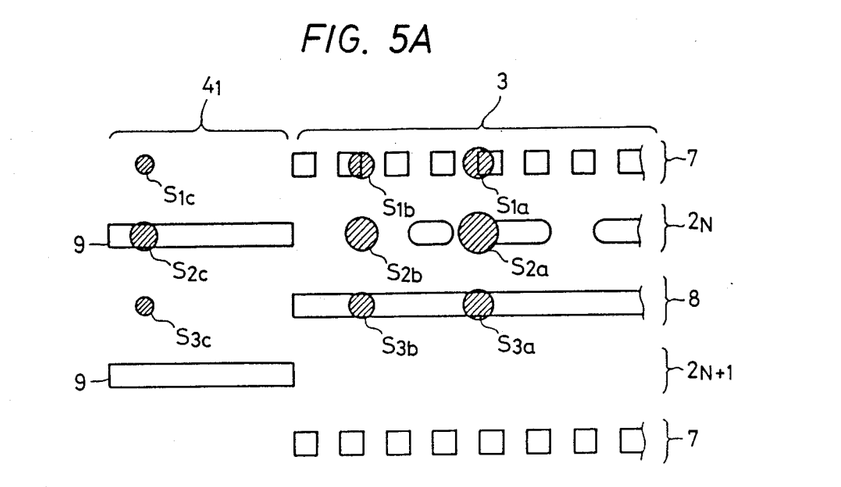
FIGS. 5A, 5B and 5C are views showing the recording operation in a variation of the first embodiment.
Figure 5B:
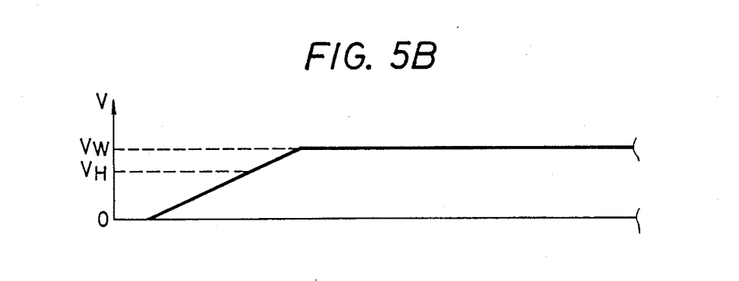
Figure 5C:
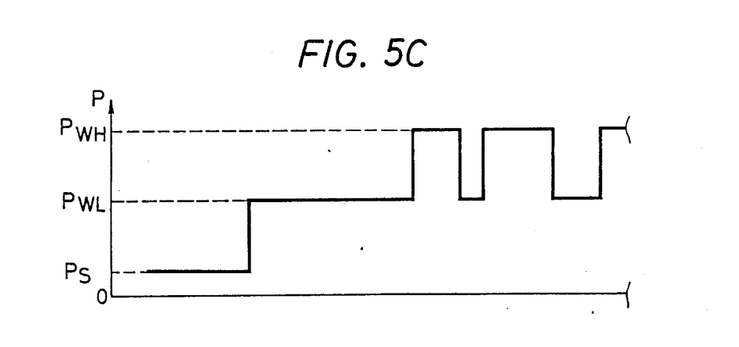

FIGS. 5A, 5B and 5C illustrate the recording operation in this embodiment, wherein FIG. 5A is an enlarged view of the recording face of the aforementioned optical card 1. Between the recording tracks $2_N$, $2_{N+1}$,... of the data recording area 3, there are alternately formed tracking tracks 8 for detecting tracking signals and clock tracks 7 for obtaining clock signals. Also in the track selecting area $4_1$ there is formed an auxiliary track 9 for maintaining the light beam on the track in the non-operating state. FIG. 5B shows the relative speed of the light beam and the recording face at positions on the optical card corresponding to FIG. 5A, and FIG. 5C shows the power P of the recording light beam at these corresponding positions.

In the apparatus shown in FIG. 4, the light beam is in fact divided into three beams, for example, by an unrepresented grating, and the resulting spots fall on the optical card 1 as shown by $S_{1a}$, $S_{2a}$, $S_{3a}$ or $S_{1b}$, $S_{2b}$, $S_{3b}$ or $S_{1c}$, $S_{2c}$, $S_{3c}$ in FIG. 5A. For the purpose of clarity, the power of light beam is represented by the diameter of spot in FIG. 5A. At information recording, the light beam scans the recording face with a constant speed $V_W$ as shown in FIG. 5B, and the information recording is made with the recording beam at the center. At the same time lateral spots respectively detect the tracking signal and the clock signal. The power of the recording beam on the optical card is modulated between $P_{WH}$ and $P_{WL}$ according to the information as shown in FIG. 5C. The powers of the spots $S_{2a}$, $S_{2b}$ are respectively set at $P_{WH}$ and $P_{WL}$. The spots for obtaining the clock and tracking signals are adjusted to low power levels which are sufficient for obtaining said signal but are insufficient for information recording.

Upon completion of the recording operation, the beam spots enter the track selecting area $4_1$, reducing the relative speed to the recording face as shown in FIG. 5B and stop at the positions $s_{1c}$, $s_{2c}$, $s_{3c}$. In this state, the speed detecting circuit 2 shown in FIG. 4 detects that the relative speed V of the light beam and the optical card has become lower than limit relative speed $V_L$ and activates the time measuring circuit 30. The time measuring circuit 30 is provided with a preset time Tc, for example 1 second, and, when the time t becomes equal to Tc, since the condition $V < V_L$ is satisfied, a power reducing signal is supplied to the laser driving circuit 31 to control the current to the semiconductor laser 11 thereby reducing the power of the spot $S_{2c}$ on the optical card to Ps. The spot thus enters a stand-by state in which it is maintained on the auxiliary track 9 by detecting the tracking signal with the spot $S_{2c}$. When the operation is started again to restore a condition $V > V_L$, the speed detecting circuit 29 increases the power of the spot to the original state to effect the information recording. The above-mentioned power $P_S$ of the spot $S_{2c}$ is selected to be the minimum level that is required for tracking and does not record on the medium even after a prolonged irradiation in a standstill state. The time measuring circuit 30 is reset if the condition $V > V_L$ is reached by the start of a succeeding operation. The aforementioned time Tc is so selected as to satisfy a condition Tc < Ts, where Ts is the time required for record formation with a stopped light beam of a power $P_{WL}$ (for example Tc = Ts/2). Also the preset time Tc may be stepwise regulated by an external selector switch or continuously regulated by a variable resistor, according to the recording sensitivity of the optical card. Though FIG. 5C illustrates that the power P is reduced to Ps as soon as the condition $V < V_L$ is reached, there is in fact an interim interval because of the function of the time measuring circuit 30.

Though the foregoing explanation is limited to the case of information recording, an identical operation takes place also in the reproduction of the information recorded on the optical card, except that a constant power $P_R$ is adopted in the operation shown in FIG. 5C.

In the following there is given an example of the selection of the intensity of the light beam in the foregoing variation embodiment. In an example with a beam spot diameter of 5 μm, a relative scanning speed of $V_W$ = 50 mm/sec in recording and a relative scanning speed of $V_R$ = 500 mm/sec in reproduction, the recording time T is related with the power P of the light beam as follows:

Ts = 100 μsec for P = 5 mW
Ts = 1 sec for P = 1 mW and
Ts = ∞ for P = 0.2 mW;

the powers of the aforementioned spots $S_{2a}$, $S_{2b}$ can be selected respectively as $P_{WH}$ = 5 mW and $P_{WL}$ = 1 mW. If he power ratio of the central spot and lateral spots, which is constant when a diffraction grating is employed, is selected as 5 : 1, the powers of the spots $S_{3a}$ and $S_{3b}$ are respectively 1 mW and 0.2 mW. It is assumed in this case that 0.2 mW is enough for obtaining the tracking signal. Since the limit relative speed $V_L$ for the light beam of 1 mW is equal to $V_L = \Phi/Ts = 5$ μm/sec, recording is not achieved with a light beam of a power lower than 1 mW since $V_W$ or $V_R > V_L$ is reached during the operation. Also if the Tc is selected as 1 second and Ps is selected as 0.2 mW, the power of the spot $S_{2c}$ is lowered to 0.2 mW before a record is formed by said spot on the auxiliary track 9 so that erroneous recording can be prevented. A similar situation can be attained by selecting a condition $P_R = 1$ mW for the reproduction of information.

As explained in the foregoing, in this embodiment, the power of the light beam is reduced to avoid erroneous recording in the non-operating state where the light beam is stopped, and the access time in the restart of operation can be reduced since the tracking control is continued in such a standstill state with reduced power.

Figure 6:
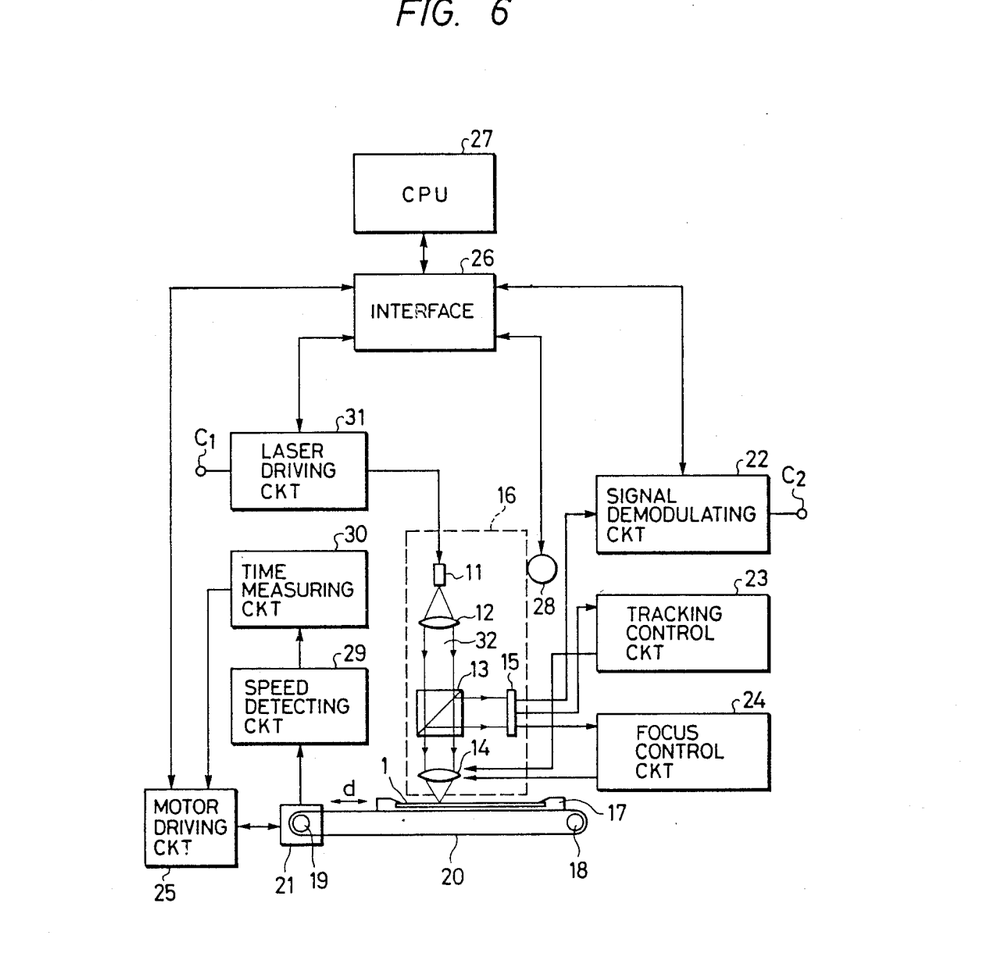
FIG. 6 is a schematic view showing the structure of a second embodiment of the optical information recording-reproducing apparatus of the present invention.

FIG. 6 is a schematic view of a second embodiment of the optical information recording-reproducing apparatus of the present invention, wherein like components as those in FIG. 4 are represented by like numbers and will not be explained in detail. As will be seen in FIG. 6, the structure of the present embodiment is almost the same as that of the first embodiment, except that the signal from the time measuring circuit 30 is supplied to the motor driving circuit 25. In the present embodiment, the time during which the light beam is stopped is measured, and the irradiating position of the light beam on the optical card is displaced before an erroneous recording takes place.

In information recording or reproduction in this apparatus, the CPU 27 controls the motor 21 and the stepping motor 28 to scan the data recording area 3 with a light beam as already explained in relation to FIG. 1. In this state the light beam 32 from the semiconductor laser 11 constantly has a power $P_{WL}$ or $P_R$ on the optical card as shown in FIG. 2, and, in information recording, a modulation up to a power $P_{WH}$ is made in response to the recording signal entered from the terminal C1. At the reproduction of information, the reproduced signal is released from the terminal C2. Upon completion of the operation, the motor 21 is stopped whereby the light beam stops in the track selecting area, with a power level $P_{WL}$ or $P_R$. When the motor 21 is stopped, the speed detecting circuit 29 identifies that the relative speed V of the optical car and the light beam have become equal to zero and activates the time measuring circuit 30, having a preset time $T_M$. When the time t becomes equal to $T_M$, since the condition V = 0 is reached an irradiating position displacing signal to the motor driving circuit 25, which, in response, activates the motor under the control of the CPU 27 to displace the irradiating position of the light beam to the other track selecting area, for example from the area $4_2$ to $4_1$. The time measurement is again started at the new location of the light beam, and this procedure is repeated until a recording or reproducing operation is started. On the other hand, the time measuring circuit 30 is reset if a condition $V \neq 0$ is reached by the start of a succeeding recording or reproducing operation within a period t < $T_M$. The preset time $T_M$ is so selected as to satisfy a condition $T_M < T_S$, the time required for obtaining a record with a stopped light beam of the aforementioned power $P_{WL}$ or $P_R$, for example $T_M = T_S/2$.

The light beam is moved to the other track selecting area in the foregoing embodiment, but it is also possible to move the irradiating position slightly in the same track selecting area. Also the irradiating position of the light beam may be displaced in the so-called track access direction, perpendicular to the track direction, instead of displacement in the track direction by the motor 21. In this case the irradiating position displacing signal from the aforementioned time measuring circuit 30 is supplied to the stepping motor 28, whereby the irradiating position is moved for example to a neighboring track. Also instead of stopping the light beam at a new position, it is furthermore possible to dissipate the energy accumulated in the original irradiating position during the movement of the light beam and to then return the light beam to the original position.

Figure 7:
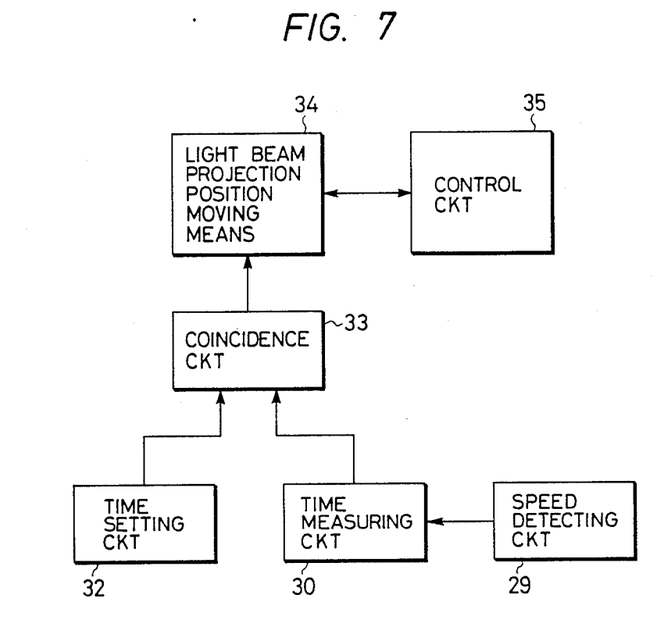
FIG. 7 is a block diagram showing a variation of timer means in the first and second embodiments.

FIG. 7 is a block diagram showing a variation of the time measuring means employed in FIG. 4 or FIG. 6. In this variation, the aforementioned time $T_{OFF}$, $T_c$ or $T_M$ is rendered arbitrarily regulatable in a range shorter than $T_S$ by a time setting circuit 32, according to the recording sensitivity of the optical card. The time measuring circuit 30, connected to the speed detecting circuit 29, starts time measurement in response to the detection of a condition $V = 0$, and, the measured value and the time selected by the time setting circuit 32 are supplied to a coincidence circuit 33, which releases an irradiating position displacing signal upon the coincidence of the two. The signal is supplied to the irradiating position displacing means such as the motor 21 shown in FIG. 6 or to the laser driving circuit 31 shown in FIG. 4, thus displacing the irradiating position of the light beam or regulating the power thereof, as in the foregoing embodiments, under the control of a control circuit 35 such as a CPU. In the time setting circuit 32, the time is stepwise or continuously regulatable by a selector switch or a variable resistor.

In the foregoing second embodiment the irradiating position of the light beam is displaced within the recording area, but it is also possible to divert the light beam from the recording area when the information recording or reproduction does not take place, as will be explained in the following.

Figure 8:
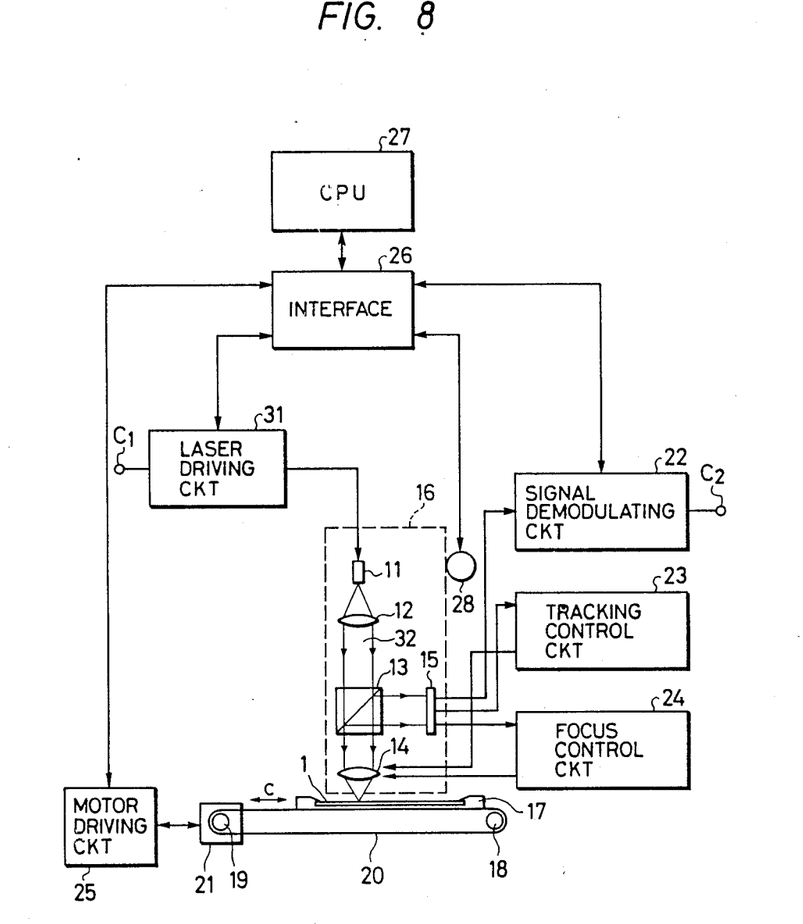
FIG. 8 is a schematic view showing the structure of a third embodiment of the optical information recording-reproducing apparatus of the present invention.

FIG. 8 is a schematic view of a third embodiment of the optical information recording-reproducing apparatus of the present invention, wherein like components as those in FIG. 4 are represented by like numbers and will not be explained in detail.

Figure 9:
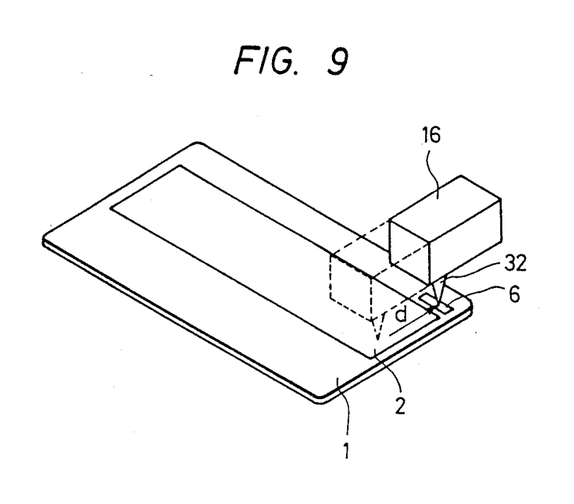
FIG. 9 is a perspective view showing the mode of movement of an optical head in the third embodiment.

In information recording or reproduction in the present embodiment, the CPU 27 controls the motor 21 and the stepping motor 28 whereby the light beam leaves the home position 6 and scans the recording area as already explained in relation to FIG. 1. In this state the light beam 32 from the semiconductor laser 11 always has a power $P_{WL}$ or $P_R$ shown in FIG. 2, and a modulation up to a level $P_{WH}$ is made at information recording in response to the recording signal entered from the terminal C1. At information reproduction the reproduced signal is released from the terminal C2. Upon completion of the operation, the motor 21 is stopped whereby the light beam stops in the track selecting area, with a power $P_{WL}$ or $P_R$. Subsequently the stepping motor 28 is activated under the control of the CPU 27, whereby the optical head 16 is moved in a direction d shown in FIG. 9 to divert the light beam 32 from the recording area 2 on the optical card 1 and to stop the same at the home position 6. At the re-start of the operation, the above-explained procedure is repeated, thus moving the light beam 32 from the home position 6 to the recording area 2 for information recording or reproduction.

In the foregoing embodiment the light beam is retracted to the home position when the recording or reproducing operation is not in progress, but the light beam may be diverted to any other position outside the recording area. The oscillation of the semiconductor laser may be interrupted when the light beam is positioned outside the recording area, but, in such case, the oscillation is preferably to be started again outside the recording area. In this manner it is rendered possible to prevent erroneous recording, eventually caused by an overshoot phenomenon at the termination or start of the laser oscillation.

The present invention is not limited to the foregoing embodiments but is subject to various modifications. For example, though the stopped state of the light beam in the foregoing embodiments is detected directly from the motor, the time measurement may be initiated by a signal from the CPU, controlling the movement of the optical card. Also the speed detection may be achieved by a signal read by the photodetector. In the aforementioned variation of the first embodiment the power of the light beam is reduced, but it is also possible, if a recording takes place with a minimum power for obtaining the tracking signal after a prolonged period, for example an hour, to reduce the power of the light beam in the nonoperating state and then to interrupt the beam irradiation in case a next access is not started within a determined period. Furthermore, the present invention is not limited to the apparatus for information recording and reproduction as explained before, but is applicable also to an apparatus exclusively designed for recording or for reproduction.

What is claimed is:

1. An apparatus for recording information on a card-shaped optical information recording medium with a light beam and/or for reproducing information recorded on said medium, comprising:
   means for irradiating said medium with a light beam;
   means for producing relative reciprocal movement between said medium and the light beam; and
   means for terminating the irradiation of the light beam on said medium, after the lapse of a determined period of time from a moment when the relative speed of said medium and the light beam is reduced below a determined speed.

2. An apparatus according to claim 1, wherein said irradiation terminating means comprises speed detecting means for detecting said relative speed; and time measuring means which initiates time measurement in response to a detection signal from said speed detecting means and, after the lapse of a determined period, supplies said light beam irradiating means with an irradiation terminating signal.

3. An apparatus according to claim 2, wherein said speed detecting means is adapted to reset said time measuring means in case said relative speed exceeds a determined speed within said determined period after the start of time measurement.

4. An apparatus according to claim 1, wherein said irradiation terminating means is adapted to terminate the irradiation of the light beam onto said medium, after the lapse of a determined period from a moment where said relative speed becomes zero.

5. An apparatus according to claim 1, further comprising means for setting said determined period.

6. An apparatus for recording information on a card-shaped optical information recording medium with a light beam and/or for reproducing information recorded on said medium, comprising:
   means for irradiating said medium with a light beam;
   means for producing relative reciprocal movement between said medium and the light beam; and
   means for displacing the irradiating position of the light beam on said medium, after the lapse of a determined period of time from a point in time when there is no relative movement between said medium and the light beam.

7. An apparatus according to claim 6, wherein said irradiating position displacing means comprises speed detecting means for detecting said relative speed, and time measuring means which initiates time measurement in response to a detection signal from said speed detecting means, and, after the lapse of a determined period, supplies said irradiating position displacing means with an irradiating position displacing signal.

8. An apparatus according to claim 7, wherein said speed detecting means is adapted to reset said time measuring means in case said relative speed exceeds a determined speed within said determined period after the start of time measurement.

9. An apparatus according to claim 6, further comprising means for setting said determined time.

10. An optical information recording-reproducing apparatus comprising:
   means for irradiating an information recording medium with a light beam; and
   means for producing relative movement of the light beam and said medium; and
   means for recording information on a recording area provided in part of a face of said medium and/or reproducing information recorded in said recording area; wherein the irradiating position of the light beam is located outside said recording area when there is no relative movement between the light beam and said medium.

11. An apparatus according to claim 10, wherein the irradiating position of said light beam is located at a home position provided outside said recording area on the medium, when said light beam and the light beam are not in relative movement.

12. An apparatus for recording information on a card-shaped optical information recording medium with a light beam and/or for reproducing information recorded on said medium, comprising:
   means for irradiating said medium with a light beam;
   means for producing relative reciprocal movement between said medium and the light beam; and
   means for reducing the power of the light beam irradiating said medium, after a lapse of a predetermined period of time from a moment when the relative speed of said medium and the light beam is reduced below a determined speed.

13. An apparatus according to claim 12, wherein said power reducing means comprises speed detecting means for detecting said relative speed; and time measuring means which initiates time measurement in response to a detection signal from said speed detecting means and, after the lapse of a determined period, supplies said light beam irradiating means with a power reducing signal.

14. An apparatus according to claim 13, wherein said speed detecting means is adapted to reset said time measuring means in case said relative speed exceeds a determined speed within said determined period after the start of time measurement.

15. An apparatus according to claim 12, further comprising means for setting said determined period.

16. A method for recording information on a card-shaped optical information recording medium and/or for reproducing information recorded on the medium, comprising the steps of:
   reciprocally scanning a light beam and the medium relative to each other; and
   setting the power of the light beam in reproduction to a level suitable for tracking, but not to perform recording even if the relative velocity between the light beam and the medium becomes less than a predetermined velocity in an end area of the medium.

* * * * *

UNITED STATES PATENT AND TRADEMARK OFFICE
CERTIFICATE OF CORRECTION

PATENT NO. : 4,912,697

DATED : March 27, 1990

INVENTOR(S) : Masahiko Enari et al.

It is certified that error appears in the above-identified patent and that said Letters Patent is hereby corrected as shown below:

On title page, item

[56] Insert under "U.S. PATENT DOCUMENTS"
--2,010,867 Kuca
  3,046,836 Schwartz, et al.
  4,152,726 Kojima, et al. .... 369/116
  4,660,189 Kuca .... 369/116--.

Insert under "FOREIGN PATENT DOCUMENTS"
--1602212 11/1981 United Kingdom
  850001818 4/1985 PCT
  59-0127266 7/1984 Japan
  0064671 11/1982 EPO--.

Insert --OTHER DOCUMENTS
     Drexon Laser Memory Card Equipment Development
and Licensing Program Quarterly Report No. 3, July 22, 1983, p. 1-30.

Drexon Laser Memory Card Equipment Development and Licensing Program Quarterly Report No. 4, October 27, 1983, p. 1-37.--.

UNITED STATES PATENT AND TRADEMARK OFFICE
CERTIFICATE OF CORRECTION

PATENT NO. : 4,912,697

DATED : March 27, 1990

INVENTOR(S) : Masahiko Enari et al.

It is certified that error appears in the above-identified patent and that said Letters Patent is hereby corrected as shown below:

COLUMN 1:

Line 39, "record pit,," should read --record pits,--.

COLUMN 2:

Line 17, "said light beam" should read --the light beam--;
    Line 18, "said medium, the apparatus" should read --the medium, said apparatus--;
    Line 29, "an" should read --and--.

COLUMN 3:

Line 6, "t" should read --to--;
    Line 31, "f" should read --of--.

COLUMN 5:

Line 18, after "than" insert --the--;
    Line 55, "variation" should be deleted;
    Line 66, "spots $S_{2a} S_{2b}$" should read --spots $S_{2a}$, $S_{2b}$--;
    Line 68, "he" should read --the--.

UNITED STATES PATENT AND TRADEMARK OFFICE
CERTIFICATE OF CORRECTION

PATENT NO. : 4,912,697

DATED : March 27, 1990

INVENTOR(S) : Masahiko Enari et al.

It is certified that error appears in the above-identified patent and that said Letters Patent is hereby corrected as shown below:

COLUMN 6:

Line 52, "optical car" should read --optical card--;
    Line 56, "signal to" should read --signal is transmitted to--.

COLUMN 10:

Line 2, change " the light beam" (second occurrence) to --said medium--.

Signed and Sealed this

Nineteenth Day of January, 1993

Attest:

DOUGLAS B. COMER

*Attesting Officer*     *Acting Commissioner of Patents and Trademarks*